United States Patent Office 3,390,204
Patented June 25, 1968

3,390,204
CROSS-LINKING AGENTS AND THEIR USE IN CROSS-LINKING UNSATURATED POLYMERS
David S. Breslow, Madelyn Gardens, Del., assignor to Hercules Incorporated, Wilmington, Del., a corporation of Delaware
No Drawing. Continuation-in-part of application Ser. No. 447,864, Apr. 13, 1965. This application Oct. 4, 1966, Ser. No. 584,116
12 Claims. (Cl. 260—837)

ABSTRACT OF THE DISCLOSURE

Unsaturated polymers can be cross-linked with polyfunctional nitrile N-oxides having the general formulae

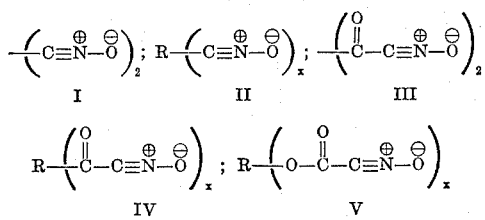

where R is an organic radical inert to the cross-linking reaction and $x$ is an integer from 2 to 10.

---

This application is a continuation-in-part of my application U.S. Ser. No. 447,864, filed Apr. 13, 1965, now abandoned.

This invention relates to a process of cross-linking unsaturated polymers and, more particularly, to the process of cross-linking unsaturated polymers with polyfunctional nitrile N-oxides and to the cross-linked products.

Known cross-linking systems for unsaturated polymers generally have certain undesirable features, such as working effectively only at highly elevated temperatures, and being adversely affected by air and moisture.

In accordance with this invention, it has been found that unsaturated polymers can be cross-linked with polyfunctional nitrile N-oxides to produce tough, solvent-resistant, cross-linked products. The instant cross-linking process can be carried out at moderate temperatures and is not adversely affected by the presence of air and moisture.

The polyfunctional nitrile N-oxides which can be used as cross-linking agents in accordance with this invention have the following general formulae:

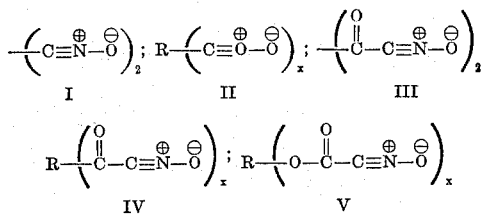

where R is an organic radical inert to the cross-linking reaction and $x$ is an integer greater than 1. Thus, R can be alkylene, cycloalkylene, arylene, aralkylene, alkarylene, alkylene-diarylene, cycloalkylene-dialkylene, arylene-dialkylene, etc., radicals such as methylene, ethylene, trimethylene, tetramethylene, pentamethylene, hexamethylene, octamethylene, decamethylene, dodecamethylene, octadecamethylene, cyclohexylene, cyclopentylene, o-, m-, and p-phenylene, naphthylene, biphenylene, anthrylene, xylylene, phenylethylene, phenylenedimethylene, phenylenediethylene, methylenediphenylene, ethylenediphenylene, cyclohexylenedimethylene cyclopentylenedimethylene, etc., or an alkylene-oxyalkylene, arylene-oxyarylene, alkarylene-oxyarylene, alkarylene-oxyalkarylene, aralkylene-oxyalkylene, aralkylene-oxyaralkylene, or the corresponding thio radicals such as methylene-oxymethylene, ethylene-oxyethylene, phenylene-oxyphenylene, methylenephenylene - oxyphenylenemethylene, phenylenemethylene-oxymethylenephenylene, ethylene-thioethylene, phenylene-thiophenylene, phenylenemethylene - thiomethylenephenylene, etc., and sulfones, such as ethylene-sulfonylethylene, m-bis(methylenesulfonyl) phenylene, etc. The maximum value for $x$ will, of course, be dependent on the number of carbon atoms in R, since the value of $x$ cannot exceed the valence of R. Preferably, $x$ will be an integer of from 2 to 10.

Exemplary of the new polyfunctional nitrile N-oxides which are useful in this invention are the bis(nitrile N-oxides) having Formula II above, as, for example, terephthalo-bis(nitrile N-oxide), 2,3,5,6-tetramethylterephthalo-bis(nitrile N-oxide), isophthalo-bis(nitrile N-oxide), malono-bis(nitrile N-oxide), succino-bis(nitrile N-oxide), glutaro-bis(nitrile N-oxide), 1,4-cyclohexane bis(carbonitrile N-oxide), methylene-bis(p,p'-benzonitrile N-oxide), methylene bis(m,m'-benzonitrile N-oxide), p-phenylene-bis(acetonitrile N - oxide), 4,4'-diphenylene-bis(carbonitrile N-oxide), and 1,5-naphthalene-bis(carbonitrile N-oxide); and polyfunctional nitrile oxides which have more than two nitrile oxide groups, such as 1,3,5-benzene-tris (carbonitrile N-oxide), 1,5,7 - naphthalene - tris(carbonitrile N-oxide), penta(acrylonitrile N-oxide) deca(crotononitrile N-oxide), as well as polyfunctional nitrile oxides such as 2,2'-oxybis(ethyl carbonitrile N-oxide), i.e., 2,2'-bis(carbonitrile N-oxide) diethyl ether, 4,4'-oxybis(phenyl carbonitrile N-oxide), i.e., 4,4'-bis(carbonitrile N-oxide) diphenyl ether, 2,2'-thiabis(ethyl carbonitrile N-oxide), 4,4'-thiabis(phenyl carbonitrile N-oxide), etc. Mixtures of two or more polyfunctional nitrile N-oxides can also be used, if desired.

Cyanogen N,N'-dioxide is a di(nitrile oxide) which has the formula

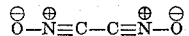

i.e., Formula I above. While this compound can be used in cross-linking unsaturated polymers in accordance with this invention, it is a highly unstable compound which is preferably generated in situ from its precursors as described in more detail below.

Another group of polyfunctional nitrile N-oxides that are useful in this invention are the polyfunctional carbonyl nitrile N-oxides having Formulas III and IV above, as for example, oxalyl bis(carbonitrile N-oxide), malonyl bis(carbonitrile N-oxide), succinyl bis(carbonitrile N-oxide), adipyl bis(carbonitrile N-oxide), sebacyl bis(carbonitrile N-oxide), 1,2,3-propane-tris(carbonyl carbonitrile N-oxide), 1,2,4-pentane-tris(carbonyl carbonitrile N-oxide), 1,4-cyclohexane-bis(carbonyl carbonitrile N-oxide), p-phenylene-bis(acetyl carbonitrile N-oxides), 2,2'-thiabis(acetyl carbonitrile N-oxide), 3,3'-thiabis(propionyl carbonitrile N-oxide), isophthalyl carbonitrile N-oxide, terephthalyl carbonitrile N-oxide, 4,4'-bis(benzoyl carbonitrile N-oxide), 4,4'-methylene-bis(benzoyl carbonitrile N-oxide), 4,4'-oxybis(benzoyl carbonitrile N-oxide), 3,3'-thiabis(benzoyl carbonitrile N-oxide), polymers containing pendant carbonitrile N-oxide groups, as for example, ethylene-acrylic acid copolymers and partially hydrolyzed poly(alkyl acrylate) where two or more of the pendant carboxyl groups have been converted to carbonyl carbonitrile N-oxide groups, etc.

Still another group of polyfunctional nitrile N-oxides that can be used as cross-linking agents in accordance with this invention are the polyfunctional carbonyl nitrile oxides having Formula V above, as for example, the ethylene glycol, tetramethylene glycol, hexamethylene glycol, 1,4-cyclohexene glycol, resorcinol, 4,4'-dihydroxybiphenylene, isopropylidene-4,4'bisphenol, etc. esters of carboxy carbonitrile N-oxides, etc.

The polyfunctional nitrile oxides are all readily prepared by treatment of the corresponding polyfunctional hydroximoyl halide, also referred to as polyfunctional hydroxamic halides, with an alkaline material, such as tertiary amines, alkali and alkaline earth metal carbonates and hydroxides, alkali and alkaline earth metal carboxylates, alkali and alkaline earth metal alkoxides, alkaline earth metal and zinc oxides, and similar basic materials. Even epoxide compounds can be used as the alkaline materials if sufficiently elevated temperatures are used. This reaction can be illustrated as follows:

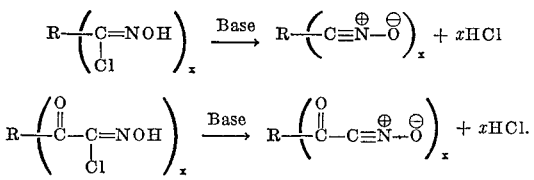

The polyfunctional nitrile N-oxides of Formula II can also be prepared by the reaction of isocyanates and tertiary amines with nitroalkanes.

The hydroximoyl halide precursors of the polyfunctional nitrile oxides having Formula II are readily obtained by reaction of an aldehyde oxime with a halogenating agent such as nitrosyl chloride, nitrosyl bromide, chlorine, bromine, etc. The hydroximoyl halide precursors of the polyfunctional nitrile oxides having Formulas III and IV can be prepared from poly(haloacetyl) compounds, such as bis(chloroacetyl), methylene-bis(chloroacetyl), ethylene-bis(chloroacetyl), o-, m-, and p-bis(chloroacetyl benzene, 4,4'-bis(chloroacetyl) biphenyl, bis(4-chloroacetylphenyl) ether, by reaction of the poly(haloacetyl) compound with a nitrosating agent such as an alkyl nitrite, $N_2O_3$, nitrosyl chloride, etc., and a hydrogen halide under anhydrous conditions.

The hydroximoyl halide precursors of the polyfunctional carbonyl nitrile oxides having Formula V are prepared by reaction of an amino ester with sodium nitrite and hydrogen halide to form a diazo ester followed by conversion of the diazo ester with nitrous acid and hydrogen halide to the hydroximoyl halide. Thus, for example, with glycine or one of its precursors, such as aminoacetonitrile, glycinate esters of diols, triols, etc., can be prepared, which can then be converted to polyfunctional carbonyl hydroximoyl halides.

The following examples illustrate the preparation of typical polyfunctional nitrile N-oxides or their precursors. Parts are by weight unless otherwise specifically indicated.

Example 1

Nitrosyl chloride was passed into a suspension of 19.8 parts of terephthalaldehyde oxime in 357 parts diethyl ether at 0° C., with stirring, until all the material was in solution and the green color which developed during the reaction had disappeared. The ether was then removed under a reduced pressure, and the solid residue was recrystallized from an ether-hexane solvent mixture, to yield 5.9 parts of terephthal-bis(hydroxamic chloride) having a melting point of 177.5–179.0° C.

Five parts of the terephthal-bis(hydroximoyl chloride) so produced was stirred into solution in 66 parts of methanol at 0° C. While the stirring was continued at 0° C., 4.23 parts of triethylamine in 13.2 parts of methanol was added over a period of one hour. The resulting slurry was filtered, and the solid material recovered, was washed twice with methanol. The product was 3.17 parts of terephthalo-bis(nitrile N-oxide) (92% conversion). This compound exhibited infrared bands characteristic of nitrile oxides at 2330 cm.$^{-1}$, 1110 cm.$^{-1}$, and 1350 cm.$^{-1}$.

No bands characteristic of the polymerization product of the nitrile oxide were present. The product was analyzed for carbon and hydrogen content, and this analysis was compared to the calculated amounts of carbon and hydrogen present in $C_8H_4N_2O_2$ as follows:

|  | Calculated Amount | Amount Found by Analysis |
|---|---|---|
| Carbon | 60.00 | 59.82 |
| Hydrogen | 2.52 | 2.90 |

Example 2

A suspension of 32.3 parts of 4,4'-bis(chloroacetyl) diphenyl ether in 175 parts of diethyl ether was stirred and saturated with dry hydrogen chloride. Then, while slowly passing in hydrogen chloride, 42 parts of isoamyl nitrite of 70% purity was added in small increments with stirring. The solids dissolved as the nitrite was added and a clear solution was obtained. The solid which formed on standing overnight at room temperature was filtered off. The filtrate was evaporated to dryness, the resulting mixture of solid and liquid was filtered and the solid was washed with a small amount of ether. The combined solids amounted to 31.8 parts, which is an 83% yield. The crude product had a melting point of 188° C. On recrystallization from ether and pentane, it had a melting point of 189–190° C. The 4,4'-oxybis(phenylglyoxylohydroximoyl chloride) so obtained has the formula

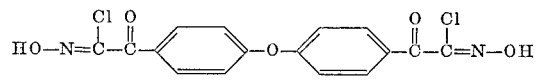

On analysis, it was found to contain 50.6% C; 2.90% H; 7.71% N; and 18.2% Cl. Theory for $C_{16}H_{10}Cl_2N_2O_5$ is 50.4% C; 2.64% H; 7.35% N; and 18.6% Cl.

Example 3

A solution of 30 parts of 1,8-dibromo-2,7-dioxooctane in 140 parts of diethyl ether was cooled in an ice bath and saturated with dry hydrogen bromide. To the cooled solution was added 29 parts of isoamyl nitrite in small increments. The reaction mixture was allowed to stand overnight at room temperature. The ether was then evaporated and the residue was recrystallized from carbon tetrachloride. The adipyl-bis(N-hydroxy formimidoyl bromide) so prepared has the formula

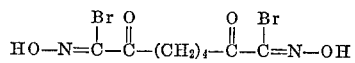

On analysis, it was found to contain 27% C; 2.92% H; 7.50% N; and 44.4% Br. Theory for $C_8H_{10}N_2O_4Br_2$ is 26.8% C; 2.81% H; 7.83% N; and 44.6% Br.

Example 4

Tetramethylene glycol was reacted with glycinyl chloride hydrochloride to prepare the bis(glycinate ester). A solution of 69.5 parts of this ester in 95 parts of water was cooled in an ice salt bath and 35 parts of concentrated hydrochloric acid was added. To the chilled solution was then added, in small increments, a solution of 34.5 parts of sodium nitrite in 50 parts of water. The addition of hydrochloric acid and sodium nitrite was then repeated. The white solid which precipitated was filtered off, washed with water, dried, and then was recrystallized from a benzene-hexane mixture. The tetramethylene bis(ester) of oxalomonohydroximoyl chloride so obtained has the formula:

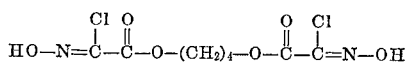

On analysis, it as found to contain 32.0% C; 3.49% H; 9.04% N; and 23.2% Cl. Theory for $C_8H_{10}N_2Cl_2O_6$ is 31.9% C; 3.35% H; 9.31% N; and 23.6% Cl.

Any type of unsaturated polymer, containing ethylenic unsaturation wherein there is at least one hydrogen radical attached to at least one of the carbon atoms of the ethylenic double bond, can be cross-linked with the instant polyfunctional nitrile N-oxides, in accordance with this invention. Among the polymers which can be cross-linked in this manner are polybutadiene-1,2; polybutadiene-1,4; styrene-butadiene copolymers; butyl rubber (polyisobutylene-isoprene copolymers); natural rubber; polyester resins such as, for example, maleate containing polyesters and polyacrylate esters; butadiene-acrylonitrile copolymers; ethylene-propylene-dicyclopentadiene terpolymers; polychloroprene; polyisoprene; alkyd resins such as, for example, tall oil alkyd resins; polyether copolymers and terpolymers containing at least one unsaturated epoxide constituent such as, for example, propylene oxide-allyl glycidyl ether copolymers and ethylene oxide-epichlorohydrin-allyl glycidyl ether terpolymers; and the like. Polymers containing acetylenic unsaturation can also be cross-linked by the instant process. Mixtures or blends of two or more of such unsaturated polymers may also be cross-linked by the instant process.

The cross-linking is carried out by contacting the unsaturated polymer and a minor amount of the polyfunctional nitrile N-oxide cross-linking agent for a time sufficient for the desired degree of cross-linking to occur. The amount of polyfunctional nitrile N-oxide added will depend on the amount of cross-linking desired. While from about 0.01% to about 50% by weight of the polymer of polyfunctional nitrile N-oxide can be used, between about 0.1% and about 10% by weight of the polymer is preferred.

The rate of cross-linking will depend on the temperature at which the unsaturated polymer and the polyfunctional nitrile N-oxide are contacted. Moderate temperatures are generally satisfactory with even room temperature cross-linking producing highly satisfactory results. Generally, temperatures between about 0° C. and about 150° C. can be used, with temperatures between about 20° C.–100° C. being preferred.

The polyfunctional nitrile N-oxide cross-linking agents are brought into uniform contact with the unsaturated polymer to achieve the desired cross-linking. This uniform contacting can be achieved by milling the polymer and the polyfunctional nitrile N-oxide, in the case of those nitrile oxides that are stable compounds, in a conventional rubber mill, by dissolving the cross-linking agent in a solvent solution of the polymer, or by other suitable procedures which will be readily apparent to those skilled in the art. This contacting will result in the polyfunctional nitrile N-oxide cross-linking agent being uniformly distributed throughout the polymer mass, so that uniform cross-linking can be achieved.

The uniform contacting of the unsaturated polymer with the polyfunctional nitrile N-oxide can also be achieved by uniformly distributing, such as by the means discussed above, a polyfunctional nitrile N-oxide precursor throughout a mass of polymer, and generating the polyfunctional nitrile N-oxide cross-linker in situ by contacting the polymer-precursor mixture with a material or materials which react with the precursor to produce the corresponding polyfunctional nitrile N-oxide. Preferably, the polymer can be uniformly mixed with a hydroximoyl halide, and this mixture treated with an alkaline material to generate the nitrile oxide in situ. In a similar manner, however, nitroalkanes can be uniformly dispersed in the polymer, and this mixture treated with isocyanates and tertiary amines to generate the corresponding polyfunctional nitrile N-oxides in situ. Such in situ generation of the polyfunctional nitrile N-oxides in the polymer mass from precursors which have been uniformly distributed in the polymer mass will, of course, result in uniform cross-linking of the polymer. This in situ method of contacting the unsaturated polymer and the polyfunctional nitrile N-oxide is the only feasible method in certain cases, for example, where a highly unstable polyfunctional nitrile N-oxide, such as cyanogen N,N'-dioxide, or the carbonyl nitrile N-oxides, is used. Where stable polyfunctional nitrile N-oxides, such as terephthalo-bis(nitrile N-oxide) and 2,3,5,6-tetramethylterephthalo-bis(nitrile N-oxide), are used, the above-described in situ process can be used or the polyfunctional nitrile N-oxide itself can be brought into uniform contact with the unsaturated polymer.

Additional ingredients can be incorporated in the polymer-polyfunctional nitrile N-oxide or the polymer-polyfunctional nitrile N-oxide precursor blend, if desired. Common rubber additives such as, for example, extenders, fillers, pigments, plasticizers and stabilizers, can be included. In many cases, however, it will be more desirable to omit such additives and add only the polyfunctional nitrile N-oxide to the unsaturated polymer.

The cross-linked polymers of this invention are hard, tough resins which are substantially insoluble in water and hydrocarbon solvents. They exhibit improved tensile properties over their uncured counterparts. These polymers are useful in various rubber applications such as, for example, as protective and decorative coatings for various substrates, including wood, metals, paper and plastics, as ingredients of tires for motor vehicles, tubing, pipes and other rubber articles, and the like.

The preparation of the instant cross-linked polymers will be further illustrated by the following specific examples. All parts and percentages referred to therein are by weight unless otherwise specifically indicated. The molecular weight of the polymers used in these examples is indicated by their reduced specific viscosity. By the term "reduced specific viscosity" (RSV) is meant the $\eta_{sp}/C$ determined on a 0.1% solution (0.1 gram of the polymer per 100 ml. of solution) of the polymer in a given solvent at the specified temperature.

Example 5

A solution of 1.0 part of cis-1,4-polybutadiene [RSV=2.6 (in benzene at 25° C.)] in 25 parts of benzene was prepared, and 0.05 part of the terephthalo-bis(nitrile N-oxide) prepared in Example 1 was added thereto, with stirring. The mixture was agitated for a short time and then allowed to stand at 25° C. for 20 minutes. The resulting product was a hard, tough rubber, which was completely gelled and is substantially insoluble in benzene.

Example 6

A solution of 1.0 part of a styrene-butadiene copolymer (25% styrene) [RSV=2.0 (in benzene at 25° C.)] in 25 parts benzene was prepared. To this solution was added 0.1 part of terephthal-bis(hydroxamic chloride), which has been prepared by the procedure described in first paragraph in Example 1. This mixture was agitated to achieve a uniform distribution of the terephthal-bis(hydroxamic chloride) in the polymer, and then was evaporated to dryness at room temperature. The solid residue was contacted with triethylamine vapors in a closed system at 25° C. for 15 minutes. The resulting rubber was hard and tough, and insoluble in benzene.

Example 7

A mixture of 0.05 part of terephthal-bis(hydroxamic chloride), prepared by the procedure described in Example 1, and a solution of 0.5 gram of a maleate-isophthalate-propylene glycol polyester (1:1 ratio of maleate:isophthalate) (Oronite Resin CR–19583, produced by the Oronite Chemical Co.) [RSV=0.09 in benzene at 25° C.] was evaporated to dryness at room temperature. The solid residue was treated with vapors of triethylamine at 25° C. for 1.5 hours. The resulting product was a hard, tough material, which was insoluble in acetone.

In a control run, the above procedure was duplicated, except that no terephthal-bis(hydroxamic chloride) was added to the polymer solution. The resulting rubber material was completely soluble in acetone.

Example 8

A mixture of a solution of 1.02 parts of a propylene oxide-allyl glycidyl ether copolymer (10% by weight allyl glycidyl ether), RSV=5.2 (in benzene at 25° C.), in a mixture of benzene and acetone, and 0.051 part of terephthal-bis(hydroxamic chloride) prepared as described in Example 1, was evaporated to dryness at room temperature. The solid residue was treated with vapors of triethylamine at 25° C. for 7 hours. The resulting rubber was hard, tough and substantially insoluble in chloroform.

A control run made in exactly the same manner, except that no terephthal-bis(hydroxamic chloride) was added to the solution of polymer, produced a rubber which was completely soluble in chloroform.

Example 9

The procedure of Example 8 was duplicated exactly, except that 1.01 parts of natural rubber were substituted for the polyether rubber used in Example 8 and 0.057 part of terephthal - bis(hydroxamic chloride) rather than 0.051 part thereof is used. The product was a hard, tough rubber, substantially insoluble in chloroform.

A control run, omitting the terephthal-bis(hydroxamic chloride), produced a rubber which was completely soluble in chloroform.

Example 10

A solution of 1.0 part cis-1,4-polybutadiene, RSV=2.6 (in benzene at 25° C.), in benzene was thoroughly mixed with 0.01 part of terephthal-bis(hydroxamic chloride) and this mixture was evaporated to dryness at room temperature. The solid residue was exposed to vapors of triethylamine at 25° C. for 2.5 hours. The resulting product was 91% insoluble in toluene.

Example 11

A mixture of a solution of 1.0 part of cis-1,4-polybutadiene, RSV=2.6 (in benzene at 25° C.), in benzene, 0.05 part of a 1:2 adduct of 2,2-bis(4-hydroxyphenyl)propane and epichlorohydrin (Epon 820, produced by Shell Chemical Co.) and 0.05 part of terephthal-bis(hydroxamic chloride) was evaporated to dryness at room temperature. The solid residue was held at 25° C. for 20 hours. The resulting product was a hard, tough, rubber, substantially insoluble in toluene.

Example 12

The procedure of Example 11 was exactly duplicated, except that 0.05 part of sodium acetate was substituted for the Epon 820 used in Example 11. The resulting product was a hard, tough rubber, substantially insoluble in toluene.

Example 13

The procedure of Example 11 was again exactly duplicated, except that here 0.06 part of zinc oxide was substituted for the Epon 820 used in Example 11. The resulting product was a hard, tough rubber, substantially insoluble in toluene.

Example 14

A mixture of 39 parts of nitrosyl chloride, 20 parts of 1,3,5-benzene tricarboxaldehyde tris(oxime) and 400 parts of diethyl ether were stirred at 0° C. until the green color which developed during reaction had disappeared and gas evolution ceased. The ether was then removed under reduced pressure. The solid residue was recrystallized from alcohol-benzene to yield 12.3 parts of 1,3,5-benzene tris(hydroxamic chloride). This product was analyzed for carbon and hydrogen content, and this analysis is compared to the calculated amounts of carbon and hydrogen present in $C_9H_6N_3O_3Cl_3$ as follows:

|  | Calculated Amount | Amount Found on Analysis |
|---|---|---|
| Carbon | 34.81 | 34.93 |
| Hydrogen | 1.95 | 1.93 |

A solution of 1.0 part of cis-1,4-polybutadiene (RSV=2.6 in benzene at 25° C.) in 25 parts of benzene was prepared, and 0.005 part of this 1,3,5-benzene tris(hydroxamic chloride) was added thereto and uniformly distributed therein by agitation. The mixture was evaporated to dryness at room temperature, and then the solid residue was contacted with triethylamine vapors in a closed system at 25° C. for one hour. The resulting rubber was substantially insoluble in benzene.

Example 15

A mixture of 32 parts of nitrosyl chloride, 20 parts of 1,4-cyclohexane dialdehyde oxime and 400 parts of diethyl ether were stirred at 0° C. until the green color which developed during reaction had disappeared and gas evolution ceased. The ether was then removed under reduced pressure. The solid residue was recrystallized from ether-hexane to yield 7.2 parts of 1,4-cyclohexane bis(hydroxamic chloride). The analysis of this product and comparison to theoretical amounts of carbon and hydrogen are as follows.

Calculated for $C_8H_{12}N_2O_2Cl_2$: C, 40.18; H, 5.06. Found on analysis: C, 40.27; H, 5.17.

A solution of 1.0 part of styrene-butadiene rubber (25% styrene, RSV=2.0 in benzene at 25° C.) in 25 parts of benzene was prepared, and 0.05 part of the bis (hydroxamic chloride) prepared in this example was added thereto and uniformly distributed therein by agitation. The mixture was evaporated to dryness at room temperature and then the solid residue was contacted with vapors of triethylamine in a closed system at 25° C. for 2 hours. The resulting rubber was substantially insoluble in benzene.

Example 16

A solution of 1.0 part of epichlorohydrin-ethylene oxide-allyl glycidyl ether terpolymer (60–32–8 weight percents, RSV=4.8 in α-chloronaphthalene at 100° C.) in 10 parts of acetone was prepared, and 0.05 part of terephthal bis(hydroxamic chloride) was added thereto and dispersed in the polymer by agitation. The mixture was evaporated to dryness at room temperature and then the solid residue was contacted with vapors of triethylamine in a closed system at 30° C. for 2 hours. The resulting rubber was substantially insoluble in acetone.

Example 17

To a solution of 1 part of an unsaturated polyester prepared by the reaction of a mixture of maleic and phthalic anhydrides with hydroxyethylated bisphenol in 5 parts of ethyl acetate was added 0.1 part of the 4,4'-oxybis(phenylglyoxylohydroximoyl chloride) prepared in Example 2. The solution was stirred and 0.05 part triethylamine was added to yield the oxybis(4-benzoyl carbonitrile N-oxide) in situ. The solution immediately turned cloudy and gelled within 30 minutes.

Example 18

Example 17 was repeated except that 0.1 part (10 drops) of 10% aqueous sodium carbonate was used instead of the triethylamine. Again, the solution gelled within a short time.

Example 19

Example 17 was repeated except that 0.1 part of the adipoyl-bis(n-hydroxy formimidoyl bromide) prepared in Example 3 was used as the cross-linker. Again, rapid gelation took place on addition of the triethylamine.

Example 20

Example 17 was repeated except that 0.2 part of the tetramethylene bis(ester) of oxalomonohydroximoyl chloride prepared in Example 4 was used as the cross-linker and 0.1 part of triethylamine was added. The reaction mixture gelled within 30 minutes.

Example 21

4,4′-methylenebis(phenylglyoxylohydroximoyl chloride) was prepared from bis(4-chloroacetylphenyl) methane by the general procedure described in Example 2 but using dioxane as the reaction diluent. On recrystallization from ether-hexane, the product had a melting point of 171–172° C. (d.). On analysis, it was found to contain 7.47% N and 18.4% Cl. Theory for $C_{17}H_{12}N_2O_4Cl_2$ is 7.39% N and 18.7% Cl.

To a solution of 1 part of the same unsaturated polyester used in Example 17 in 5 parts of dioxane was added 0.2 part of the above 4,4′-methylenebis(phenylglyoxylohydroximoyl chloride). The solution was stirred and 0.1 part of triethylamine was added. The reaction mixture was completely gelled within 15 minutes.

What I claim and desire to protect by Letters Patent is:

1. The process of cross-linking unsaturated polymers containing ethylenic unsaturation wherein there is at least one hydrogen radical attached to at least one of the carbon atoms of the ethylenic double bonds which comprises uniformly contacting an unsaturated polymer with from about 0.01% to about 50% by weight of the polymer of a polyfunctional nitrile N-oxide having the formula selected from the group consisting of

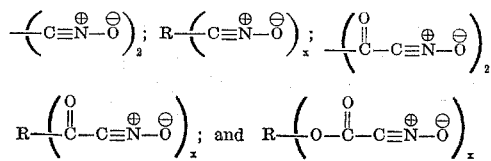

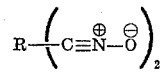

where R is an organic radical inert to the cross-linking reaction and $x$ is an integer from 2 to 10 at a temperature of from about 0° C. to about 150° C.

2. The process of claim 1 wherein the polyfunctional nitrile N-oxide has the formula:

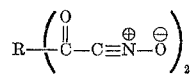

3. The process of claim 2 wherein the polyfunctional nitrile N-oxide is terephthalo-bis(nitrile N-oxide).

4. The process of claim 1 wherein the polyfunctional nitrile N-oxide has the formula:

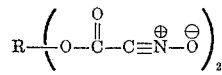

5. The process of claim 4 wherein the polyfunctional nitrile N-oxide is oxybis(4-benzoyl carbonitrile N-oxide).

6. The process of claim 4 wherein the polyfunctional nitrile N-oxide is adipyl-bis(carbonitrile N-oxide).

7. The process of claim 1 wherein the polyfunctional nitrile N-oxide has the formula:

$$R\!-\!\!\left(\!O\!-\!\overset{O}{\overset{\|}{C}}\!-\!C\!\equiv\!\overset{\oplus}{N}\!-\!\overset{\ominus}{O}\right)_{\!2}$$

where R is alkylene.

8. The process of claim 1 wherein said uniform contacting is effected by uniformly mixing said unsaturated polymer and a polyfunctional nitrile N-oxide precursor, and treating the resulting mixture with a material reactive with said precursor to yield said polyfunctional nitrile N-oxide, whereby said polyfunctional nitrile N-oxide is generated in situ and uniformly contacts said unsaturated polymer.

9. The process of claim 8 wherein said precursor is a polyfunctional hydroximoyl chloride, and said reactive material is an alkaline material.

10. The process of claim 9 wherein said precursor is terephthal-bis(hydroximoyl chloride).

11. The process of claim 9 wherein said precursor is 4,4′-oxybis(phenylglyoxylohydroximoyl chloride).

12. An unsaturated polymer containing ethylenic unsaturation wherein there is at least one hydrogen radical attached to at least one of the carbon atoms of the ethylenic double bonds cross-linked with a polyfunctional nitrile N-oxide having the formula selected from the group consisting of

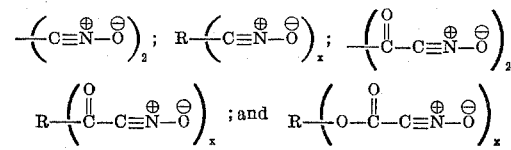

where R is an organic radical inert to the cross-linking reaction and $x$ is an integer from 2 to 10.

No references cited.

WILLIAM H. SHORT, *Primary Examiner.*

R. T. LYON, *Assistant Examiner.*